United States Patent [19]
Vaughn

[11] Patent Number: 4,791,402
[45] Date of Patent: Dec. 13, 1988

[54] FRONT SIGNAL LIGHT FOR AUTOMOTIVE VEHICLE

[76] Inventor: Ernest L. Vaughn, 314 Sanders Ferry Rd., Hendersonville, Tenn. 37075

[21] Appl. No.: 27,728

[22] Filed: Mar. 19, 1987

[51] Int. Cl.⁴ .............................................. B00Q 1/26
[52] U.S. Cl. ........................................ 340/74; 340/84; 362/253; 362/240
[58] Field of Search ................... 340/74, 84, 106, 107, 340/110, 66, 67, 71, 87, 94; 362/61, 80, 240, 253

[56] References Cited
U.S. PATENT DOCUMENTS 2,081,790  5/1937  Braun .................................. 340/109
4,680,680  7/1987  Iwaki et al. ............................ 340/94

Primary Examiner—Joseph A. Orsino
Assistant Examiner—Anh H. Tran
Attorney, Agent, or Firm—Harrington A. Lackey

[57] ABSTRACT

A signal light device mounted on the front end of an automotive vehicle and provided with a central illuminating chamber having downward diverging light passageways for projecting light rays, when actuated, forward, upward, downward and laterally for signaling to another vehicle entering the mainstream of traffic, permission to enter the mainstream of traffic, to cross in front of the signaling vehicle, or to change lanes. The signal device may also include a pair of right and left illuminating signal chambers on opposite sides of the central chamber for projecting light forward and laterally outboard to indicate permission to another vehicle to enter an intersection in front of the signaling vehicle.

12 Claims, 2 Drawing Sheets

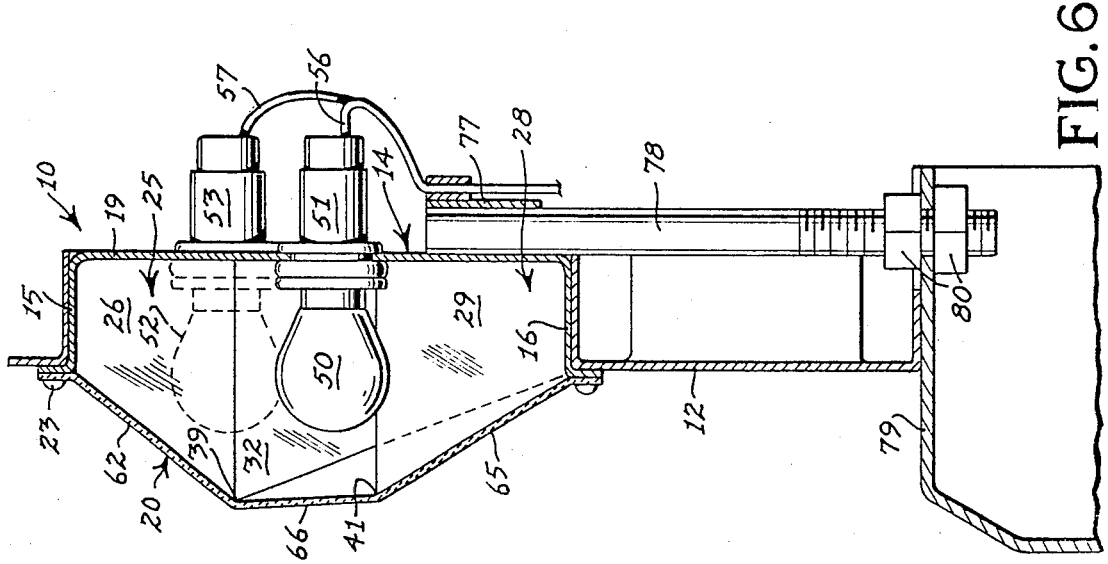
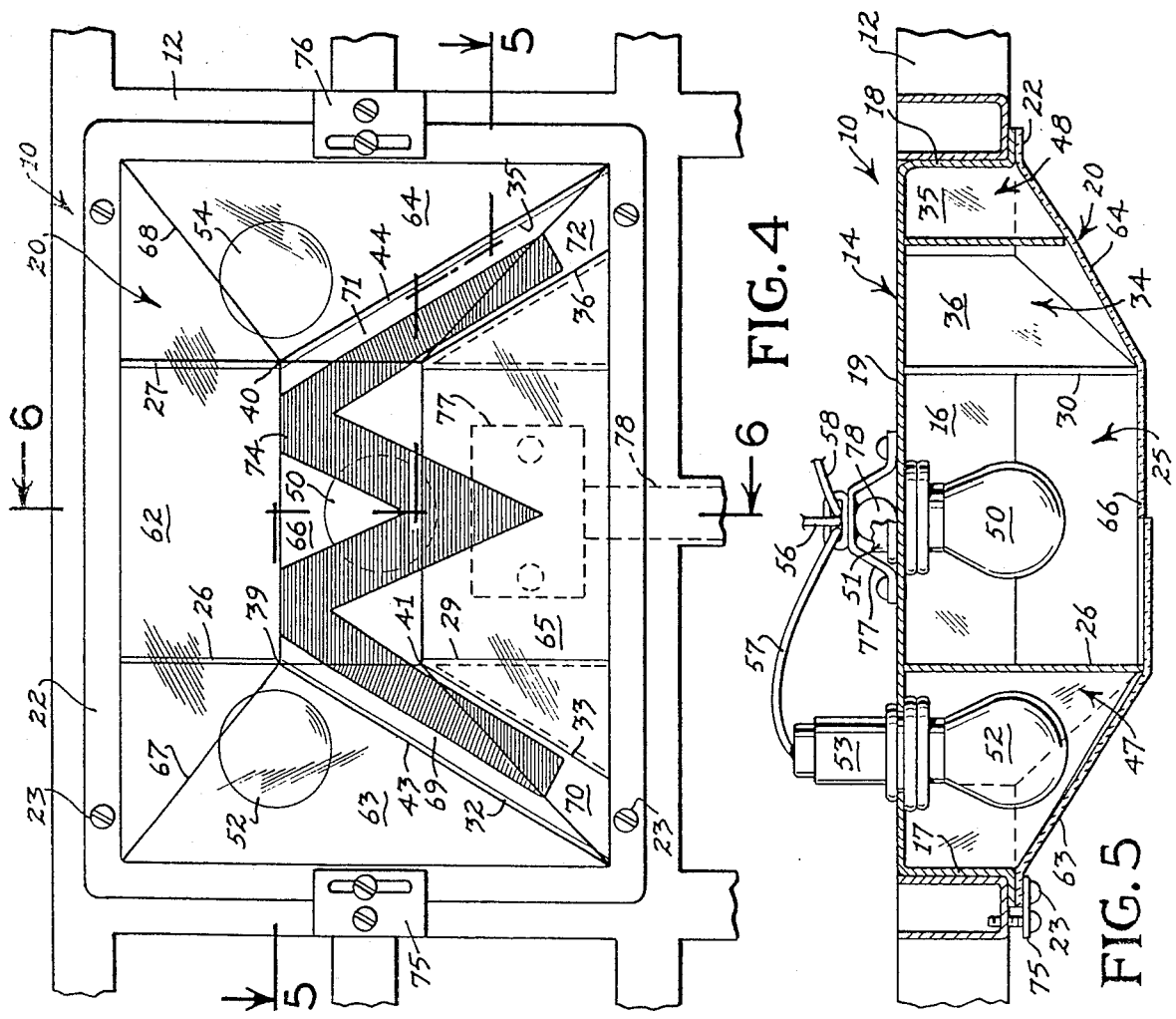

FRONT SIGNAL LIGHT FOR AUTOMOTIVE VEHICLE

BACKGROUND OF THE INVENTION

This invention relates to a signal light for mounting on the front end of an automotive vehicle, and more particularly to a front signal light for indicating to other automotive vehicles acknowledgment to merge or pass in front of the signaling vehicle, or to change lanes in front of the signaling vehicle.

Heretofore, signal lights of numerous types have been utilized or designed for use on automotive vehicles in order to indicate braking, turning, passing, deceleration, or acceleration.

Moreover, signal lamps have been designed for automotive vehicles including a plurality of illuminating chambers within a single light unit, such as those disclosed in the following U.S. Pat. Nos.:

| | | |
|---|---|---|
| 1,981,302 | Bobroff | Nov. 20, 1934 |
| 2,078,894 | Haines | Apr. 27, 1937 |
| 2,139,587 | Husemoller | Dec. 6, 1938 |
| 2,400,655 | Saia | May 21, 1946 |
| 2,483,687 | Wisuri | Oct. 4, 1949 |
| 2,503,336 | Hines | Apr. 11, 1950 |
| 3,229,250 | Melkonian | Jan. 11, 1966 |
| 3,491,336 | Anderson | Jan. 20, 1970 |

FIGS. 1 and 2 of Saia and FIG. 2 of Melkonian disclose signal lights mounted on the front of an automotive vehicle, and are adapted to be illuminated to signal various passing or non-passing situations. In order for the signaling devices of Saia and Melkonian to be effective, the front signal light units must be used in combination with a rear signal light unit in order to properly control the passing situations contemplated by the respective patentees.

The U.S. Pat. No. to Anderson 3,491,336 also discloses a two-compartment illuminated chamber having lateral diverging light passageways adapted to be mounted upon the front of an automotive vehicle in order to signal the braking mode of the signaling vehicle.

However, none of the above patents, or any other prior art known to the Applicant, includes a signal light particularly adapted for indicating to another vehicle approaching the mainstream of traffic, such as an approaching vehicle on the entrance ramp to an interstate highway, clearance for merging in front of the signaling vehicle.

SUMMARY OF THE INVENTION

It is therefore an object of this invention to provide a signal light device mounted on the front of an automotive vehicle, and which is particularly adapted for signaling permission to other vehicles, in front of and also to the side of the signaling vehicle, to merge, pass in front, particularly at intersections, and to change lanes.

Another object of this invention is to provide a front signal light device for an automotive vehicle which will improve the flow of traffic by reducing the hesitation of motorists in a merging, lane change, or intersectional traffic situation, including four-way stop traffic situations.

The signal device made in accordance with this invention includes a lamp housing having a central illuminating chamber having downward diverging passageways and having chamber and passageway walls which project forward the housing, to project light rays, not only forward, but also up and down and laterally to the left and right of the vehicle.

It is a further object of this invention to provide a signal light device incorporating a central main chamber having a downward projecting lower main chamber and a pair of diverging left and right passageways, which generally resemble the letter "M" as an initial for a "merge" signal.

It is a further object of this invention to provide a signal light device having a central illuminated chamber with a pair of diverging left and right light passageways with inner passage walls which project farther forward than the outer passage walls to permit the light rays in these passageways to project laterally outboard of the housing. Preferably, the housing includes an additional pair of left and right separately illuminated chambers laterally outward of said passageways for signaling automotive vehicles to the left or right of an intersection to permit yielding of the right-of-way at the intersection.

The signal light device further includes partition walls within the lamp housing defining the separate central chamber and its diverging passageways, as well as the left and right signal chambers, in which the front edges of the partition walls are inclined forward beyond the perimeter of the mounting housing toward the central portion of the housing. A transparent cover member is fitted over the front of the housing and against the front edges of the partition walls to project the illumination from the signal device not only forward, but up and down and laterally both left and right.

BRIEF DESCRIPTION OF THE DRAWINGS

FIG. 4 is an enlarged, front elevational view of the signal device of this invention mounted upon the front grill of an automotive vehicle, shown fragmentarily;

FIG. 5 is a fragmentary section taken along the line 5—5 of FIG. 4; FIG. 6 is a fragmentary section taken along the line 6—6 of FIG. 4;

DESCRIPTION OF THE PREFERRED EMBODIMENTS

Figure 1:
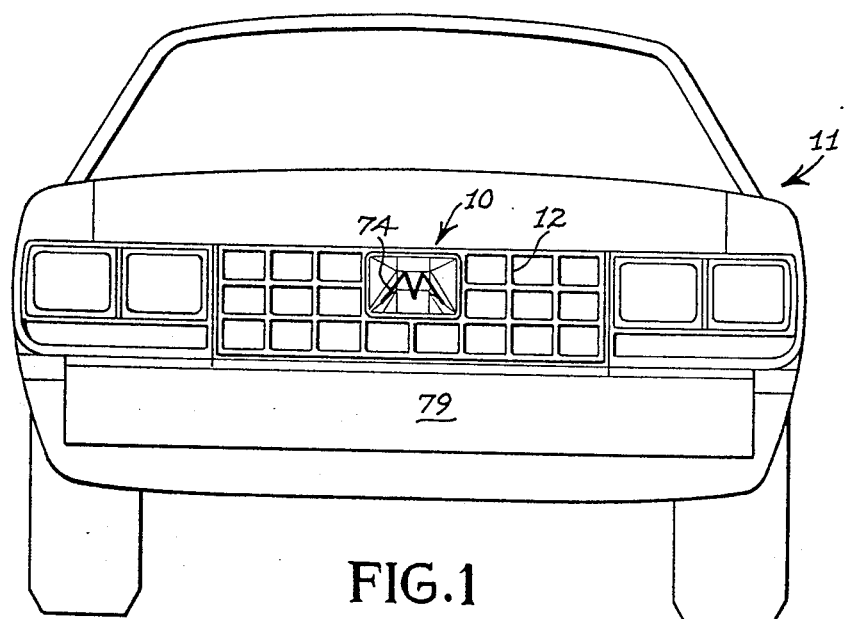
FIG. 1 is a front elevational view of an automotive vehicle upon the front end of which is mounted a signal device made in accordance with this invention.

The signal light device 10 made in accordance with this invention is illustrated in FIGS. 1 and 4–6 as mounted upon the front end of an automotive vehicle, such as the automobile 11. Specifically, the front signal light device 10 is illustrated as being mounted in the front grill 12 of the automobile 11.

As best illustrated in FIGS. 2–6, the signal light device 10 includes a rectangular housing 14 having a top wall 15, a bottom wall 16, and opposed side walls 17 and 18. The top and bottom walls 15 and 16, and side walls 17 and 18 intersect each other in a rectangular shape and project forward from a common back wall 19, having a light reflective surface. The open front end of the housing 14 is preferably covered by a transparent cover member 20 having a rectangular peripheral flange 22 adapted to fit flush against a corresponding rectangular housing flange 21. The flange 22 is secured to the flange 21 by means of the cover screws 23.

A central illuminating or lamp chamber 25 is formed in the central portion of the housing 14 by means of a pair of opposed side chamber walls 26 and 27. The lower section 28 of the central lamp chamber 25 is defined by the opposed lower chamber walls 29 and 30. All of the chamber walls 26, 27, 29, and 30 project forward from the back wall 19. The side chamber walls 26 and 27 also are connected to the top wall 15, while the lower chamber walls 29 and 30 are connected to the bottom housing wall 16.

The upper and lower chamber walls 26 and 29 are separated by a right signal light passageway 31 defined by a pair of right passage walls 32 and 33. Likewise, the upper and lower chamber walls 27 and 30 are separated by a left light passageway 34 defined by the passage walls 35 and 36.

Although the chamber walls 26 and 29 are illustrated as being coplanar, and the walls 27 and 30 are illustrated as being coplanar and parallel with the corresponding walls 26 and 29, nevertheless, such walls may occupy other configurations.

The opposed surfaces of the chamber walls 26 and 27, and 29 and 30, as well as the opposed surfaces of the walls 32 and 33, and 35 and 36 are light reflective.

The front edges 37 and 38 of the chamber walls 26 and 27 are inclined to the back wall 19 and project forward from the top edge of the top wall 15 and terminate in the middle portion of the housing 14 at central points 39 and 40. The front edges of the lower chamber walls 29 and 30 also are inclined away from the front edge of the bottom wall 16 to lower central points 41 and 42, which preferably are in the same vertical plane as the central points 39 and 40.

The right passage wall 32 also has an inclined edge 43 which projects forward from the right bottom corner of the housing 14 toward the center portion of the housing 14 where the front edge 43 terminates in the central point 39, with the top right passage wall 32 intersecting the right chamber wall 26. In like manner, the left top passage wall 35 projects from the lower left corner of the housing 14 into the middle portion of the housing 14 where the passage wall 35 intersects the left chamber wall 27. The front edge 44 of the top left passage wall 35 also inclines from the front edge of the bottom wall 16 forward until it terminates in the central point 40, as best disclosed in FIGS. 3 and 4.

The bottom right passage wall 33, spaced below the top right passage wall 32, extends from the bottom wall 16 inward, until the bottom right passage wall 33 intersects the right lower chamber wall 29. The front edge 45 of the bottom right passage wall 33 also inclines forward from the front edge of the bottom wall 16 until it terminates in the lower central point 41. In like manner, the bottom left passage wall 36, spaced below its opposed passage wall 35, extends from the bottom wall 16 inward, until the passage wall 36 intersects the lower left chamber wall 30. The front edge 46 of the bottom left passage wall 36 is also inclined forward from the front edge of the bottom wall 16 until it terminates in lower central point 42.

Figure 3:
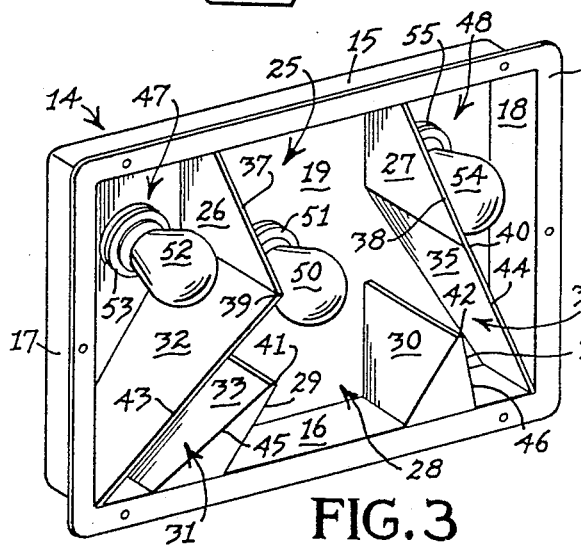
FIG. 3 is a view similar to FIG. 2, with the trans parent cover member removed.

Accordingly, the central lamp chamber 25, including its lower chamber section 28, occupies substantially the entire middle portion of the housing 14 from the top wall 15 to the bottom wall 16. The right and left signal passage ways 31 and 34 intersect the central lamp chamber 25 and diverge downward. Moreover, as best illustrated in FIGS. 3 and 6, the front portions of the lower passage walls 33 and 36 project farther forward than the corresponding front portions of the opposed passage walls 32 and 35, because the front edges 45 and 46 are inclined at steeper angles to the back wall 19 than are the front edges 43 and 44. Thus, light rays passing through the signal passage ways 31 and 34 are not only projected forward, but also, to some extent, laterally outboard both right and left of the housing 14 by the lower passage walls 33 and 36, respectively.

Also, in a preferred form of the invention, the outer, or right side, surfaces of the upper chamber wall 26 and the top right passage wall 32 form, with the opposed portions of the top wall 15 and the right side wall 17, a right signal chamber 47.

In like manner, the outer, or left side, surfaces of the upper chamber wall 27 and the top left passage wall 35 form, with the corresponding opposed portions of the top wall 15 and the left side wall 16, a left signal chamber 48. All the wall surfaces of the respective signal chambers 47 and 48 are also light reflective.

A central lamp or light bulb 50 is supported in a socket 51 mounted in approximately the center of the back wall 19, for illuminating the chambers 25 and 28, and the light passageways 31 and 34.

A right lamp or light bulb 52 is supported in a socket 53 within the back wall 19 of the right signal chamber 47. Likewise, a left signal lamp or light bulb 54 is supported in a socket 55 within the back wall 19 of the left signal chamber 48.

Figure 7:
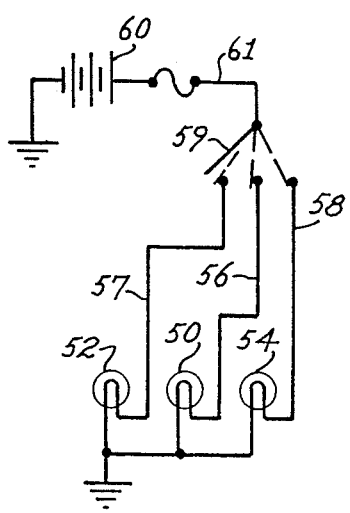
FIG. 7 is a schematic diagram of the electrical circuit for illuminating the signal light device.

The lamp sockets 51, 53, and 55 are connected through leads or conductors 56, 57, and 58 to a selective three-way switch 59, which in turn is connected to battery 60 through line 61, as best disclosed in FIG. 7.

The transparent cover member 20 is contoured to fit flush against all of the front edges of the various chamber and passage walls, and has a prismatic shape, as illustrated in the drawings. In a preferred form of the invention, a rectangular gasket, not shown, will fit between the flanges 21 and 22 to properly seal the area between the flanges 21 and 22. The cover member 20 may be removed for replacing the bulbs 50, 52, and 54.

The cover member 20 includes a top planar lens panel 62, a right planar side lens panel 63, a left planar side lens panel 64, a bottom planar lens panel 65, and a rectangular center lens panel 66, which is substantially parallel to the back wall 19. The top panel 62, the side panels 63 and 64, and the bottom panel 65 all project at an angle forward from the respective front edges of the housing 14 and terminate in the corresponding edges of the front or central lens panel 66.

The corners of the central lens panel 66 correspond with the central points 39, 40, 41, and 42. The top lens panel 62 is planar throughout its length to its angular edges 67 and 68 which intersect with the corresponding side lens panels 63 and 64 respectively. The lower edge of the right lens panel 53 terminates along the front edge 43 of the top passage wall 32. Likewise, the lower edge of the left side lens panel 64 terminates along the front edge 44 of the top left passage wall 35. The lateral edges of the bottom lens panel 65 terminate along the front edges 45 and 46 of the corresponding bottom passage walls 33 and 36.

The portions of the cover member which covers the front opening of the light passageways 31 and 34 are disclosed in the drawings as comprising two triangular portions 69 and 70, and 71 and 72, respectively, since the front openings of these passage ways are not planar. The triangular lens sections 69 and 70 could be formed in a curved configuration, as could the combination of the triangular lens sections 71 and 72. In any event, the lens sections 69-70 and 71-72 permit the transmission of light rays from the respective right and left light passageways 31 and 34 to emanate not only forward, but also laterally outboard in the respective right and left directions from the housing 14.

The central portion of the top lens panel 62, the central lens panel 66, and the central portion of the bottom lens panel 65 permit the light rays from the bulb 50 to project not only forward, but also upward through the lens panel 62 and downward through the lens panel 65.

The right portion of the top panel 62 between its edge 67 and the chamber wall 26, and the right lens panel 63 permit light rays from the bulb 52 to project not only forward, but also upward and outboard to the right of the housing 14. In the same manner, the left portion of the top lens panel 62 between the left intersecting edge 68 and the left chamber wall 27, and the left lens panel 64 permit light rays from the left bulb 54 to project through the lens cover 20 not only forward, but also upward and outboard to the left of the housing 14.

Figure 2:
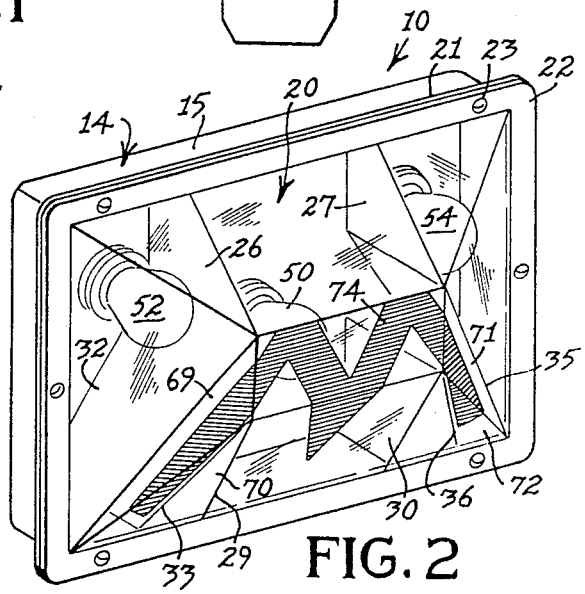
FIG. 2 is a front perspective view of the signal light device made, in accordance with this invention.

As best disclosed in FIG. 4, the central panel 66 and the right and left passage lens panels 69-70 and 71-72 generally form the shape of the letter "M" which is the initial for the word "MERGE", the primary signal given by the device 10. In order to emphasize the letter "M", an indicia or character 74 in the shape of the letter "M" having downward diverging outer legs and inward converging legs, as illustrated in FIGS. 1, 2, and 4, is superimposed upon the lens cover 20, so that the outer legs extend longitudinally over the two light passageways 31 and 34 while the converging inner legs extend over the central and lower lamp chamber 28. Moreover the width of each of the outer legs of the "M" character is preferably less than the width of the corresponding passageway 31 and 34 to permit the transmission of light from the passageways forward past the legs of the character 74. The character 74 may be opaque, or it may be translucent, so long as it is emphasized as the letter "M" during the illumination of the light bulb 50. Moreover, the letter "M" may be molded into the lens material, secured by an adhesive, or formed in any other convenient manner.

The housing 10 may be mounted by any suitable means to the front end of the automobile 11, such as upon the grill 12. One example of such mounting means are the clamp plates 75 and 76, as best illustrated in FIG. 4, as well as the mounting bracket 77 supporting a vertical mounting bolt 78 which may be secured to the bumper 79 by the threaded nuts 80 (FIG. 6).

In the operation of the signal light device 10, the device 10 is mounted on the front end of an automotive vehicle, such as the automobile 11, and is so mounted that it is separate from the other conventional lights, such as the headlights and turn signals. Since the conventional headlights are mounted on the left and right of the front of the vehicle, it is preferred that the signal light device 10 be mounted in the center of the front end of the automobile 11, as illustrated in FIG. 1.

Figure 8:
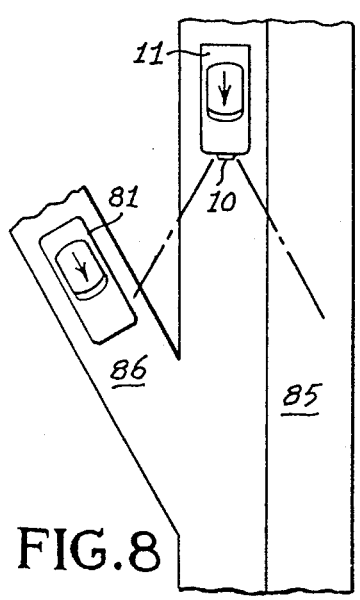
FIG. 8 is a schematic plan view of the operation of the device in a merging traffic situation.

The primary purpose of the signal light device 10 is to signal another vehicle 81 permission to pass in front of the signaling vehicle 11. For example, assuming that the signaling vehicle 11 is moving forward on an interstate highway 85 (FIG. 8), and another vehicle 81 is approaching the interstate highway 85 on its entrance ramp 86, and desires to enter the mainstream of traffic upon the interstate highway 85, the operator of the automobile 11, in order to accommodate the motorist in the approaching vehicle 81, turns the switch 59 to close the circuit 56 and energize the central lamp 50. The illuminated lamp 50 projects light rays through the front of the device 10, and specifically through the top lens panel 62, the central lens panel 66 and the bottom lens panel 65. Moreover, light rays from the illuminated lamp 50 are also projected through the passage ways 31 and 34, and through the transparent panel sections 69-70 and 71-72, so that light is projected forward, upward, ownward, and laterally outboard both left and right in order to indicate to the approaching vehicle 81 that it has permission to enter the mainstream of traffic on the highway in front of the signaling vehicle 11. Since the approaching vehicle 81 is not only in front of, but also to the right side of the signaling vehicle 11, the illumination of the signal light device 10 is apparent to the motorist in the approaching vehicle 81 both from the front and from the side.

If the ramp 86 is on an incline so that the vehicle 81 is approaching at a lower level than the signaling vehicle 11, the approaching vehicle 81 will also be apprised of the merge signal from the device 10 through the bottom lens panel 65, as well as from the left lens panel sections 69 and 70. If the ramp 86 is descending from a higher grade to the interstate 85, the motorist of the approaching vehicle 81 will be apprised of the merge signal from the device 10 through the top lens panel 62, as well as through the right lens panel sections 69 and 70.

The merge signal is emphasized by the inclusion of the "M" character 74 imposed over the central and lower portions of the cover member, so that the "M" character 74 is highlighted, or even illuminated, by the light rays from the central lamp 50 through the central lens panel 66 and the left and right passage lens panels 69-70 and 71-72.

Figure 9:
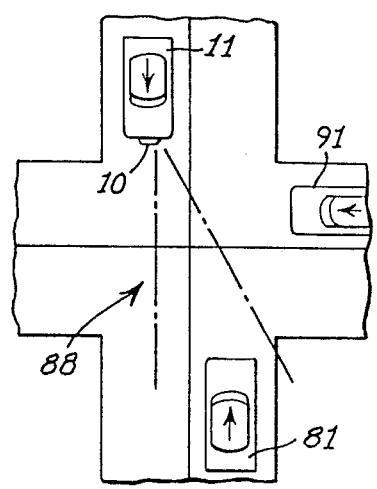
FIG. 9 is a schematic plan view illustrating the operation of the device to signal other vehicles at an intersection.

In the illustration of FIG. 9, the signaling vehicle 11 having the signal light device 10 is approaching or stopped at the intersection 88, such as a four-way stop intersection. If the operator of the signaling vehicle 11 desires to permit the vehicle 81 on the opposite side of the intersection to make a left turn in the intersection 88, the vehicle 11 can stop and turn on its switch 59 to energize the circuit 56 and again illuminate the signal lamp 50. The illuminated signal device 10 will then apprise the operator of the vehicle 81 to execute its left turn without apprehension of encountering the signaling vehicle 11.

Also in FIG. 9, if the vehicle 91 is stopped at the intersection 88 and the approaching vehicle 11 wishes to reassure the motorist of the vehicle 91 to cross the inter section 88 in front of the signaling 11, he can illuminate 17 both the central lamp 50 and his left signal lamp 54 to acknowledge permission of the vehicle 91 to move first through the intersection. The same operation would apply if a vehicle such as 91 were approaching the intersection 88 from the other or right side.

The signal light device 10 may also be used to signal a vehicle in front of the signaling vehicle 11 to change lanes, particularly if the leading vehicle has actuated his turn signal indicating that the leading vehicle desires to turn into the same lane and in front of the signaling vehicle 11. Here only the central signal lamp 50 would be required.

In view of the fact that most functions of the signal light device 10 could require only the illumination of the central signal lamp 50 which directs light rays not only forward, but upward and downward, and also to a lesser extent to the left and right of the device 10, the right and left signal lamps 52 and 54 can be optional.

It will also be apparent that the areas between the passageways 31 and 34 and the lower central chamber 28 will not be illuminated, in order to emphasize the unique character of the illuminated portion of the cover member 20. Furthermore, when the lamps 52 and 54 are not illuminated, these chambers will also be non-illuminated, to further emphasize the illumination in the central portion of the device 10, as well as the downward diverging passageways 31 and 34.

Although it is possible to illuminate more than one bulb 50, 52, and 54 at a time, nevertheless, in the preferred operation of the device 10, only one lamp 50, 52, or 54 is illuminated at any one time, in order to transmit and emphasize that particular signal.

What is claimed is:

1. A signal light device for the front end of an automotive vehicle, comprising:
    (a) a lamp housing having a light reflective back wall, vertically spaced top and bottom walls projecting forward from said back wall, left and right side portions and a front portion,
    (b) a pair of opposed side chamber walls within said lamp housing projecting downward from said top wall and defining a central lamp chamber,
    (c) top and bottom right passage walls defining a right light passageway intercepting and diverging downward from said central lamp chamber,
    (d) top and bottom left passage walls defining a left light passageway intercepting and diverging downward from said central lamp chamber,
    (e) illuminating means within said central lamp chamber for projecting light forward through said front portion and through said right and left light passageways,
    (f) all said passage walls terminating in front edges, the front edges of both said bottom passage walls projecting farther forward than the corresponding portions of the front edges of both said corresponding top passage walls,
    (g) each of said bottom passage walls having light reflective surfaces to reflect light in said corresponding passageways laterally outward, to the right and left of said lamp housing, and
    (h) mounting means on said lamp housing for supporting said lamp housing on the front end of an automotive vehicle.

2. The invention according to claim 1 in which said passage walls terminate in the bottom wall of said lamp housing.

3. The invention according to claim 2 in which said central lamp chamber comprises a lower chamber section having opposed lower chamber walls intersecting the bottom wall of said lamp housing and spaced from said bottom passages walls, the spacing between each of said lower chamber walls and said bottom passage walls being opaque to illumination by said illuminating means.

4. The invention according to claim 3 in which said lower chamber walls intersect the upper portions of said bottom passage walls.

5. The invention according to claim 4 in which the upper portions of said top passage walls intersect said corresponding side chamber walls.

6. The invention according to claim 5 in which said side chamber walls have front edges which extend from the top wall of said lamp housing forward to the middle portion of said lamp housing and diverge from said back wall to a pair of corresponding central points, the front edges of said top passage walls extending from said bottom wall and diverging from said light reflective back wall to said corresponding central points.

7. The invention according to claim 6 in which said front edges of said bottom passage walls diverge away from said back wall and extend from said bottom wall of said lamp housing forward to corresponding lower central points below and in substantially the same vertical plane as said central points.

8. The invention according to claim 7 in which said lamp housing further comprises opposed side walls spaced outwardly from said chamber walls and said top passage walls, to define corresponding right and left signal chambers, right illuminating means within said right signal chamber and left illuminating means in said left signal chamber for projecting light forward and laterally outboard from said corresponding right and left signal chambers.

9. The invention according to claim 8 in which the outer surfaces of said chamber walls and said top passage walls are reflective to reflect light from said right and left illuminating means forward and laterally outward from said corresponding signal chambers.

10. The invention according to claim 9 further comprising switch means for selectively energizing one of said illuminating means.

11. The invention according to claim 7 further comprising a front transparent cover having substantially the same configuration as said lamp housing, said front transparent cover abutting against all of said front edges of said chamber and passage walls, said front transparent cover having marginal edge portions fitting the front surfaces of said top and bottom walls.

12. The invention according to claim 11 further comprising an indicia member in the shape of the letter "M" having downward diverging outer legs and converging inner legs, said indicia member being adhered to said front transparent cover whereby said diverging outer legs extend along said front transparent cover portions between said corresponding top and passage walls, and said converging inner legs extend downward between said lower chamber walls, the width of said diverging outer legs being less than the width of said corresponding passageways.

* * * * *